United States Patent
Masaki et al.

(10) Patent No.: US 9,964,434 B2
(45) Date of Patent: May 8, 2018

(54) ELECTRET TYPE VIBRATION DETECTION SYSTEM, METHOD OF CREATING EXTERNAL VIBRATION INFORMATION, METHOD OF CREATING TRANSFER FUNCTION INFORMATION REGARDING EXTERNAL VIBRATION, PROGRAM FOR CREATING EXTERNAL VIBRATION INFORMATION, AND PROGRAM FOR CREATING TRANSFER FUNCTION INFORMATION REGARDING EXTERNAL VIBRATION

(71) Applicants: OMRON Corporation, Kyoto-shi, Kyoto (JP); Tokyo Institute of Technology, Tokyo (JP)

(72) Inventors: Tatsuakira Masaki, Kyoto (JP); Shinichi Nakao, Tokyo (JP); Hideshi Nishida, Shiga (JP); Eiichi Sasaki, Tokyo (JP); Hiroshi Yamaguchi, Tokyo (JP)

(73) Assignees: OMRON Corporation, Kyoto (JP); Tokyo Institute of Technology, Tokyo (JP)

( * ) Notice: Subject to any disclaimer, the term of this patent is extended or adjusted under 35 U.S.C. 154(b) by 497 days.

(21) Appl. No.: 14/404,926

(22) PCT Filed: Feb. 28, 2013

(86) PCT No.: PCT/JP2013/055419
§ 371 (c)(1),
(2) Date: Dec. 1, 2014

(87) PCT Pub. No.: WO2013/179709
PCT Pub. Date: Dec. 5, 2013

(65) Prior Publication Data
US 2015/0149123 A1 May 28, 2015

(30) Foreign Application Priority Data

May 30, 2012 (JP) ................................ 2012-123487

(51) Int. Cl.
*H02N 2/00* (2006.01)
*G01H 11/06* (2006.01)
(Continued)

(52) U.S. Cl.
CPC .......... *G01H 11/06* (2013.01); *G01M 5/0008* (2013.01); *G01M 7/00* (2013.01)

(58) Field of Classification Search
CPC ............................. G01H 11/06; G01M 5/0008
(Continued)

(56) References Cited

U.S. PATENT DOCUMENTS

| 5,721,710 A * | 2/1998 | Sallas | G01V 1/375 367/38 |
| 2006/0100666 A1* | 5/2006 | Wilkinson | A61B 5/08 607/1 |

(Continued)

FOREIGN PATENT DOCUMENTS

| JP | 4-204261 A | 7/1992 |
| JP | 9-79900 A | 3/1997 |

(Continued)

OTHER PUBLICATIONS

International Search Report for corresponding International Application No. PCT/JP2013/055419, dated May 28, 2013 (2 pages).
(Continued)

*Primary Examiner* — Eman Alkafawi
(74) *Attorney, Agent, or Firm* — Osha Liang LLP (57) ABSTRACT

An electret type vibration detection system has a vibration-powered generator that performs vibration-induced power generation by displacing on a basis of external vibration an
(Continued)

electret group formed of a plurality of electrets and an electrode group having a plurality of electrode pairs in a relative movement direction to output a vibration-induced voltage between electrodes of the electrode pair, and a transfer function memory section that stores transfer function information that defines a correlation between a vibration velocity of the external vibration and an output power voltage of the vibration-powered generator in a range of a predetermined frequency included in the external vibration, wherein the transfer function information contains a transfer coefficient set according to each of a plurality of frequencies belonging to the predetermined frequency range to place the vibration velocity of the external vibration and the output power voltage of the vibration-powered generator in a predetermined proportional relationship.

9 Claims, 6 Drawing Sheets (51) Int. Cl.
 *G01M 5/00* (2006.01)
 *G01M 7/00* (2006.01)

(58) Field of Classification Search
 USPC .......................... 702/198; 310/300, 309, 324
 See application file for complete search history.

(56) References Cited

U.S. PATENT DOCUMENTS

| | | | | |
|---|---|---|---|---|
| 2007/0145861 A1* | 6/2007 | Tanner | ...................... | A45F 3/08 310/339 |
| 2008/0246201 A1* | 10/2008 | Shibayama | ............. | F16F 15/02 267/140.15 |
| 2010/0088035 A1* | 4/2010 | Etgen | ....................... | G01V 1/30 702/16 |
| 2011/0260699 A1* | 10/2011 | Nakatsuka | ............... | H01G 7/02 322/2 R |
| 2012/0306313 A1* | 12/2012 | Nakatsuka | ............... | H02N 1/08 310/300 |
| 2013/0201316 A1* | 8/2013 | Binder | .................... | H04L 67/12 348/77 |

FOREIGN PATENT DOCUMENTS

| | | |
|---|---|---|
| JP | 11-148815 A | 6/1999 |
| JP | 2010-048751 | 3/2010 |
| JP | 2013-250088 A | 12/2013 |

OTHER PUBLICATIONS

Y. Arakawa et al.; "Micro Seismic Power Generator Using Electret Polymer Film", Power MEMS 2004, Nov. 2004, p. 187-190 (4 pages).

T. Masaki et al.; "Development of a Compact Vibration-Driven Micropower Generator Using Electret Materials;" 18 Symposium on "Microjoining and Assembly Technology in Electronics," vol. 18; Yokohama; Jan. 31-Feb. 1, 2012; pp. 11-14; (6 pages).

H. Doi et al.; "Shindo Hatsuden Aijitusu no Saishin Kdoko, Development and Application of a Compact Vibration-Driven Micropower Generator using Electret Materials;" Function & materials; vol. 30, No. 10; Sep. 5, 2010; pp. 21-28 (10 pages).

Y. Kobayashi et al.; "Kisetsu Kyoryo no Chojumyoka no Tameno Gijutsu, Monitoring System Using Power Generated by Bridge Vibration;" Bridge and foundation engineering, vol. 44, No. 8; Aug. 1, 2010; pp. 69-72 (6 pages).

\* cited by examiner

ELECTRET TYPE VIBRATION DETECTION SYSTEM, METHOD OF CREATING EXTERNAL VIBRATION INFORMATION, METHOD OF CREATING TRANSFER FUNCTION INFORMATION REGARDING EXTERNAL VIBRATION, PROGRAM FOR CREATING EXTERNAL VIBRATION INFORMATION, AND PROGRAM FOR CREATING TRANSFER FUNCTION INFORMATION REGARDING EXTERNAL VIBRATION

BACKGROUND

Technical Field

The present invention relates to a technology of creating information regarding external vibration using a vibration-powered generator that generates electricity from external vibration using an electret.

Related Art

Lately, demands on using electricity obtained by detecting external vibration generated in a constructional structure such as a bridge or a road in maintenance of the constructional structure remarkably increase. For example, a vibration displacement of external vibration applied to a constructional structure significantly affects a strength change of the constructional structure, and demands on detection thereof are relatively significant. In this regard, in the related art, the vibration displacement was detected using a laser displacement sensor or electromagnetic energy (for example, refer to Patent Literature 1). In the technique discussed in Patent Literature 1, information regarding a displacement of the external vibration is detected by controlling a response of a vibrator that responds to external vibration using a coil and a service power supply.

Meanwhile, a vibration-powered generator using an electret, capable of generating electricity from external vibration, has been developed (for example, refer to Patent Literature 1). In the technique discussed in Non-patent Literature 1, electric power of 6 μW is generated from external vibration having an amplitude of 1 mm and a frequency of 10 Hz using an electret. However, this technique fails to disclose a configuration of appropriately detecting information regarding a velocity or a displacement of external vibration using a vibration-powered generator that has an electret and performs vibration-induced power generation from external vibration.

PATENT LITERATURES

Patent Literature 1: Japanese Patent Application Publication NO. 2010-48751
Patent Literature 2: Japanese Patent Application Publication No. H9-79900
Patent Literature 3: Japanese Patent Application Publication No. H11-148815
Non-Patent Literature 1: Y. Arakawa, Y. Suzuki, and N. Kasagi, "Micro Seismic Power Generator Using Electret Polymer Film", Power MEMS 2004, November, 2004, p. 187-190

SUMMARY

In the related art, when an optical device such as a laser displacement sensor is used in order to detect information regarding external vibration applied to an inspection object such as a constructional structure, the device having a large size is used. Therefore, its operability is not satisfactory, and a separate power supply is necessary to drive the device. Accordingly, it is difficult to measure abundant vibration information regarding the inspection object. Meanwhile, when a vibration-powered generator that performs vibration-induced power generation from external vibration is employed, an output power from a device can be used as a power supply. However, the technique of the related art fails to disclose a configuration of appropriately connecting the output power of the vibration-powered generator to vibration information.

One or more embodiments of the present invention easily and accurately detects external vibration information using an electret.

One or more embodiments of the invention recognizes that predetermined proportionality exists between the external vibration velocity and the output power voltage for each frequency of the external vibration input to the vibration-powered generator by focusing on the transfer function information that defines a correlation between the vibration velocity (hereinafter, also referred to as "external vibration velocity") of the external vibration applied to the vibration-powered generator having electrets and the output power voltage of the vibration-powered generator. In addition, one or more embodiments of the present invention easily and accurately creates velocity information or displacement information relating to the external vibration from a transition of the output power voltage of the vibration-powered generator caused by the external vibration by preparing transfer function information depending on the frequency of the external vibration using a transfer coefficient corresponding to the predetermined proportionality.

More specifically, according to one or more embodiments of the invention, there is provided an electret type vibration detection system including: a vibration-powered generator that performs vibration-induced power generation by displacing on the basis of external vibration an electret group formed of a plurality of electrets and an electrode group having a plurality of electrode pairs in a relative movement direction to output a vibration-induced voltage between electrodes of the electrode pair; a transfer function memory section that stores transfer function information that defines a correlation between a vibration velocity of the external vibration and an output power voltage of the vibration-powered generator in a range of a predetermined frequency included in the external vibration, the transfer function information containing a transfer coefficient set according to each of a plurality of frequencies belonging to the predetermined frequency range to place the vibration velocity of the external vibration and the output power voltage of the vibration-powered generator in a predetermined proportional relationship; an output spectrum information computing section that performs a Fourier transform on the transition information relating to the output power voltage of the vibration-powered generator within a predetermined time period to compute output spectrum information relating to the output power voltage; and a vibration velocity information creating section that creates vibration velocity information relating to the external vibration in the predetermined time period, based on the output spectrum information relating to the output power voltage of the vibration-powered generator computed by the output spectrum information computing section and the transfer function information stored in the transfer function memory section.

In the electret type vibration detection system provided with the vibration-powered generator according to one or more embodiments of the invention, the vibration-powered generator outputs, as an output power voltage between electrodes of the electrode pair, a change of the charge capacity depending on external vibration between an electrode group and an electret group that can move relatively using a property of the electret capable of semipermanently holding charges. Therefore, the vibration-powered generator outputs the output power voltage depending on external vibration applied to itself. However, the applicants found a correlation between the vibration velocity of external vibration applied to the vibration-powered generator and the output power voltage, which is very useful for creating information regarding external vibration.

That is, the applicants found predetermined proportionality between the external vibration velocity and the output power voltage for each frequency of external vibration input to the vibration-powered generator. For this predetermined proportionality, it is possible to derive a transfer coefficient corresponding to a proportionality constant that determines the proportionality for each frequency of external vibration input to the vibration-powered generator. In addition, it is possible to form transfer function information that defines a correlation between the vibration velocity of external vibration and the output power voltage of the vibration-powered generator within a predetermined frequency range included in the external vibration based on the transfer coefficient. The transfer function information including the transfer coefficient formed in this manner is information regarding a function that transforms the output power voltage of the vibration-powered generator into the vibration velocity of the external vibration within a predetermined frequency range included in the external vibration, and the transfer coefficient that forms the transfer function information is a proportionality constant in the predetermined proportionality. Therefore, this transform is significantly effective. Accordingly, it is possible to easily and accurately compute the vibration velocity of the external vibration using this transform.

Since the transfer function information defines a correlation between the vibration velocity of the external vibration and the output power voltage of the vibration-powered generator within a predetermined frequency range included in the external vibration, the electret type vibration detection system can easily and accurately perform the transform depending on the frequency included in the external vibration. In general, since the external vibration contains various frequency components, it can be said that a configuration using this transfer function information is practical. Therefore, according to one or more embodiments of the present invention, the predetermined frequency is set based on the anticipated frequency component included in the external vibration.

Since the electret type vibration detection system has an output spectrum information computing section, the output spectrum information corresponding to the frequency component is computed by performing a Fourier transform for the transition information relating to the output power voltage of the vibration-powered generator. In addition, since the system has a vibration velocity information creating section, information regarding the vibration velocity of the external vibration is created in consideration of the transfer function information based on the computed output spectrum information. It is noted, since the output spectrum information computing section performs a Fourier transform for the transition information relating to the output power voltage, according to one or more embodiments of the present invention, the vibration velocity information creating section performs an inverse Fourier transform to create the vibration velocity information relating to the external vibration.

In this manner, in the electret type vibration detection system according to one or more embodiments of the invention, as newly recognized by the applicants, the transfer function information is prepared using "predetermined proportionality existing between the external vibration velocity and the output power voltage for each frequency of the external vibration input to the vibration-powered generator." Therefore, it is possible to easily and accurately create information regarding the vibration velocity of the external vibration from the output of the vibration-powered generator.

Here, the electret type vibration detection system may further include a vibration displacement information creating section that creates vibration displacement information relating to the external vibration of the predetermined time period by integrating the vibration velocity information relating to the external vibration of the predetermined time period created by the vibration velocity information creating section. By employing this configuration, it is possible to crate displacement information relating to the external vibration just by integrating the vibration velocity information relating to the external vibration one time. Since the electret type vibration detection system is susceptible to a noise as the number of integral calculations increases, if the displacement information relating to the external vibration can be created with a small number of integral calculations as in one or more embodiments of the invention, it is significantly useful practically.

In the electret type vibration detection system described above, the vibration-powered generator may include: a casing that houses the electret group and the electrode group; a fixing member that is provided with the electrode group and fixed to the casing side; and a movable member that is provided with the electret group and that is capable of relatively moving on the basis of the external vibration while facing the fixing member. In this case, ends of respective electrets included in the electret group along the relative movement direction at a possible maximum amplitude assumed when the movable member is vibrated by the external vibration may not cross an electrode-side interval between one of the electrodes of the electrode group and an electrode neighboring to the one of the electrodes. The vibration-powered generator having such a configuration is called a "non-transverse mode vibration-powered generator."

In general, in the vibration-powered generator using electrets, a relatively high output power voltage is generated when a plurality of electrets included in the electret group cross an electrode group included in an electrode group may times by virtue of external vibration. The vibration-powered generator having such a configuration is called a "transverse mode vibration-powered generator" in comparison with the non-transverse mode vibration-powered generator. In the transverse mode vibration-powered generator, since each electrode of the electrode group is separated with a predetermined cavity, that is, an electrode-side interval, the electrode-side interval affects the output power voltage of the vibration-powered generator as the electret group moves relative to the electrode group. As a result, the output power voltage is generated by superposing a transition of a ripple voltage affecting the electrode-side interval on a transition of the vibration-induced voltage corresponding to the external vibration. For this reason, there is possibility that each processing in the output spectrum information computing section, the vibration velocity information creating section, and the vibration displacement information creating section is influenced by a transition of the ripple voltage.

Meanwhile, in the non-transverse mode vibration-powered generator described above, since ends of each electret at a possible maximum amplitude assumed when the movable member where the electret group is provided is vibrated by the external vibration do not cross an electrode-side interval, a ripple voltage caused by the electrode-side interval is not superposed on the output power voltage of the vibration-powered generator. For this reason, a transition of the output power voltage of the vibration-powered generator very suitably depends on the external vibration. Therefore, it is possible to prevent a noise generating factor unnecessary from the viewpoint of creating information regarding external vibration as long as possible.

Although a description has been made for advantages obtained by applying a non-transverse mode vibration-powered generator to the electret type vibration detection system according to one or more embodiments of the invention, it is not intended to exclude application of the transverse mode vibration-powered generator to such a system. Naturally, the transverse mode vibration-powered generator may be applied to such a system.

Here, one or more embodiments of the invention may be embodied as a method of creating external vibration information such as vibration velocity or vibration displacement of external vibration. That is, according to one or more embodiments of the invention, there is provided a method of creating external vibration information, including: obtaining transition information relating to an output power voltage within a predetermined time period from a vibration-powered generator that performs vibration-induced power generation by displacing on the basis of external vibration an electret group formed of a plurality of electrets and an electrode group having a plurality of electrode pairs in a relative movement direction by virtue of external vibration and outputs a vibration-induced voltage between electrodes of the electrode pair; computing output spectrum information relating to the output power voltage by performing a Fourier transform on the obtained transition information relating to the output power voltage; and creating vibration velocity information relating to external vibration within the predetermined period based on the computed output spectrum information and transfer function information that defines a correlation between the vibration velocity of the external vibration in a range of a predetermined frequency included in the external vibration and the output power voltage of the vibration-powered generator, this transfer function information containing a transfer coefficient set according to each of a plurality of frequencies belonging to the predetermined frequency range to place the vibration velocity of the external vibration and the output power voltage of the vibration-powered generator in a predetermined proportional relationship. Furthermore, the method may further include creating vibration displacement information relating to the external vibration within the predetermined time period by integrating the created vibration velocity information relating to the external vibration in the predetermined time period.

Similarly to the electret type vibration detection system described above, the method of creating external vibration information according to one or more embodiments of the invention uses the "transfer function information that defines a correlation between the vibration velocity of external vibration and the output power voltage of the vibration-powered generator within a predetermined frequency range included in the external vibration" by reflecting "predetermined proportionality existing between the external vibration velocity and the output power voltage for each frequency of the external vibration input to the vibration-powered generator." Therefore, it is possible to easily and accurately create information regarding the vibration velocity of the external vibration from the output of the vibration-powered generator.

The aforementioned non-transverse mode vibration-powered generator may be applied to the vibration-powered generator used in the method of creating external vibration information described above. As a result, it is possible to prevent a noise generating factor unnecessary from the viewpoint of creating information regarding external vibration as long as possible.

Here, one or more embodiments of the invention may be embodied as a method of creating transfer function information regarding external vibration described above. That is, according to one or more embodiments of the invention, there is provided a method of creating transfer function information that defines a correlation between an output power voltage in a range of a predetermined frequency included in external vibration and a vibration velocity of the external vibration in the predetermined frequency range in a vibration-powered generator that performs vibration-induced power generation by displacing on the basis of the external vibration an electret group formed of a plurality of electrets and an electrode group having a plurality of electrode pairs in a relative movement direction and outputs a vibration-induced voltage between electrodes of the electrode pair. The vibration-powered generator has: a casing that houses the electret group and the electrode group; a fixing member that is provided with the electrode group and fixed to the casing side; and a movable member provided with the electret group and that is capable of relatively moving on the basis of the external vibration while facing the fixing member, such that ends of respective electrets included in the electret group along the relative movement direction at a possible maximum amplitude assumed when the movable member is vibrated by the external vibration do not cross an electrode-side interval between one of the electrodes of the electrode group and an electrode neighboring to the one of the electrodes. In addition, the method of creating transfer function information includes: applying the external vibration of a plurality of frequencies belonging to the predetermined frequency range to the vibration-powered generator; computing a transfer coefficient for placing the vibration velocity of the external vibration and the output power voltage of the vibration-powered generator in a predetermined proportional relationship corresponding to each of the frequencies based on transition information relating to the output power voltage of the vibration-powered generator corresponding to each of the plurality of frequencies when the external vibration of the plurality of frequencies is applied; and creating transfer function information that defines a correlation between the vibration velocity of the external vibration and the output power voltage of the vibration-powered generator based on the transfer coefficient corresponding to each of the frequencies.

That is, one or more embodiments of the invention relates to a method of creating transfer function information used when the external vibration information is created using the non-transverse mode vibration-powered generator. In this method, it is possible to obtain transfer function information capable of preventing a noise generating factor unnecessary from the viewpoint of creating information regarding external vibration as long as possible.

Here, one or more embodiments of the invention may be embodied as a program for creating external vibration information, the program causing a computer to create information regarding external vibration applied to a vibration-powered generator that performs vibration-induced power generation by displacing on the basis of external vibration an electret group formed of a plurality of electrets and an electrode group having a plurality of electrode pairs in a relative movement direction and outputs a vibration-induced voltage between electrodes of the electrode pair. In this case, the program causing the computer to execute: obtaining transition information relating to an output power voltage within a predetermined time period from the vibration-powered generator; computing output spectrum information relating to the output power voltage by performing a Fourier transform on the obtained transition information relating to the output power voltage; and creating vibration velocity information relating to the external vibration within the predetermined period based on the computed output spectrum information and transfer function information that defines a correlation between the vibration velocity of the external vibration in a rage of a predetermined frequency included in the external vibration and the output power voltage of the vibration-powered generator, this transfer function information containing a transfer coefficient set according to each of a plurality of frequencies belonging to the predetermined frequency range to place the vibration velocity of the external vibration and the output power voltage of the vibration-powered generator in a predetermined proportional relationship. Furthermore, the program may further cause the computer to create vibration displacement information relating to the external vibration within the predetermined time period by integrating the created vibration velocity information relating to the external vibration in the predetermined time period.

Similarly to the electret type vibration detection system described above, the program for creating external vibration information according to one or more embodiments of the invention also uses, in the implementation thereof, the "transfer function information that defines a correlation between the vibration velocity of external vibration and the output power voltage of the vibration-powered generator within a predetermined frequency range included in the external vibration" by reflecting "predetermined proportionality existing between the external vibration velocity and the output power voltage for each frequency of the external vibration input to the vibration-powered generator." Therefore, it is possible to easily and accurately create information regarding the vibration velocity of the external vibration from the output of the vibration-powered generator.

The non-transverse mode vibration-powered generator described above may be applied to the vibration-powered generator serving as a target of the program for creating external vibration information. As a result, using this program, it is possible to prevent a noise generating factor unnecessary from the viewpoint of creating information regarding external vibration as long as possible.

Here, one or more embodiments of the invention may be embodied as a program for creating transfer function information regarding external vibration, the program causing a computer to create transfer function information that defines a correlation between an output power voltage in a range of a predetermined frequency included in the external vibration and a vibration velocity of the external vibration in the predetermined frequency range in a vibration-powered generator that performs vibration-induced power generation by displacing on the basis of the external vibration an electret group formed of a plurality of electrets and an electrode group having a plurality of electrode pairs in a relative movement direction and outputs a vibration-induced voltage between electrodes of the electrode pair. The vibration-powered generator has: a casing that houses the electret group and the electrode group; a fixing member that is provided with the electrode group and fixed to the casing side; and a movable member that is provided with the electret group and that is capable of relatively moving on the basis of the external vibration while facing the fixing member, such that ends of respective electrets included in the electret group along the relative movement direction at a possible maximum amplitude assumed when the movable member is vibrated by the external vibration being configured not to cross an electrode-side interval between one of the electrodes of the electrode group and an electrode neighboring to the one of the electrodes. The program causes the computer to execute applying external vibration of a plurality of frequencies belonging to the predetermined frequency range to the vibration-powered generator; computing a transfer coefficient for placing the vibration velocity of the external vibration and the output power voltage of the vibration-powered generator in a predetermined proportional relationship corresponding to each of the frequencies based on transition information relating to the output power voltage of the vibration-powered generator corresponding to each of the plurality of frequencies when the external vibration of the plurality of frequencies is applied; and creating transfer function information that defines a correlation between the vibration velocity of the external vibration and the output power voltage of the vibration-powered generator based on the transfer coefficient corresponding to each of the frequencies.

That is, according to one or more embodiments of the invention, there is provided a program for creating transfer function information used to create external vibration information using the non-transverse mode vibration-powered generator. By causing a computer to execute this program, it is possible to obtain transfer function information capable of preventing a noise generating factor unnecessary from the viewpoint of creating information regarding external vibration as long as possible.

One or more embodiments of the present invention may make it possible to easily and accurately detect external vibration information using electrets.

DETAILED DESCRIPTION

Hereinafter, embodiments of the invention will be described with reference to the accompanying drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention. It is noted that the configurations of the following embodiments are just exemplary, and the invention is not limited to the configuration described in these embodiments.

Figure 1:
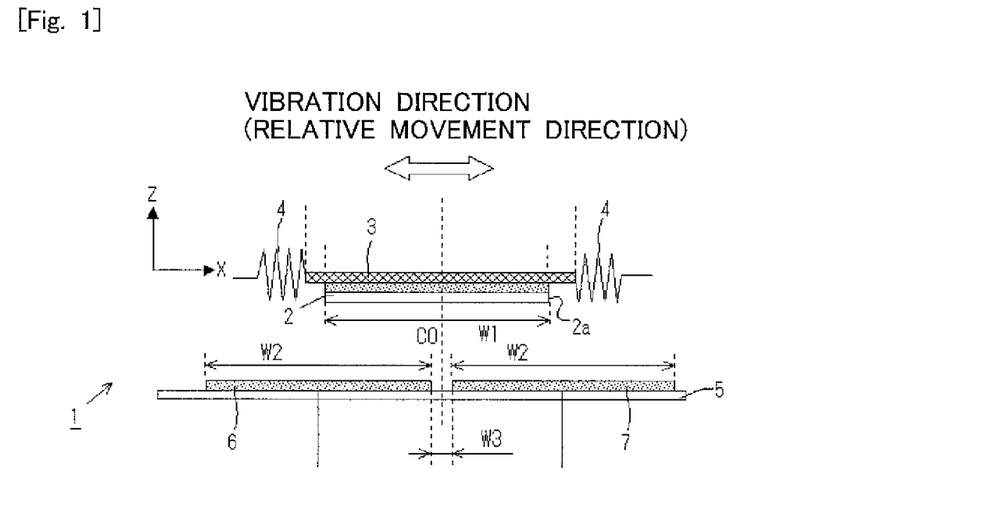
FIG. 1 is a diagram illustrating a schematic configuration of a vibration-powered generator according to one or more embodiments of the invention.

FIG. 1 is a cross-sectional view taken along a longitudinal section (ZX plane) of the vibration-powered generator 1 for illustrating a schematic configuration of a vibration-powered generator 1 used in an electret type vibration detection system (hereinafter, simply referred to as a "vibration detection system") 10 according to one or more embodiments of the invention, particularly, a configuration of generating electricity from external vibration. It is noted that the entire configuration of the vibration detection system 10 will be described below based on FIGS. 2 and 3.

The vibration-powered generator 1 has a movable member 3 and a fixing member 5 housed in a casing (not illustrated). The movable member 3 and the fixing member 5 are configured to move relatively along an X-direction while the facing state is maintained. In addition, according to one or more embodiments of the present invention, the fixing member 5 is fixed to the casing, and both ends of the movable member 3 are connected to the casing by interposing springs 4. For this reason, the movable member 3 itself is configured to move (vibrate) against the casing and the fixing member 5 by virtue of external vibration applied to the vibration-powered generator 1.

It is noted that the movable member 3 and the fixing member 5 are configured to move relatively while they face each other, and a paralleled state therebetween is maintained, that is, while an interval between facing planes is constantly maintained. As a result, by virtue of an action of the electret 2 in the movable member 3 side, a vibration-induced voltage is generated between a pair of electrodes 6 and 7 in the fixing member 5 side. A principle of generating the vibration-induced voltage is described in the related art, and a description thereof will not be repeated herein. In addition, a configuration of maintaining an interval between the movable member 3 and the fixing member 5, that is, a configuration for maintaining a smooth relative movement therebetween is important to improve electric generation efficiency from external vibration. However, this configuration does not relate to the invention of the application, so that a description will not be made for this configuration.

Here, a structure of the movable member 3 will be described. On a surface of the movable member 3 facing the fixing member 5, a plurality of electrets 2 formed on a conductor are arranged side by side with an equal distance along a vibration direction (X-direction). It is noted that only a single electret 2 is illustrated in FIG. 1 for simplifying a structure of the vibration-powered generator 1. In addition, a width of the electret 2 along the vibration direction is denoted by "W1." It is noted that, according to one or more embodiments of the present invention, the electret 2 is configured to semipermanently hold a negative charge. Then, a description will be made for a structure of the fixing member 5 side. On the surface of the fixing member 5 facing the movable member 3, a plurality of pairs of electrodes 6 and 7 are arranged side by side with an equal interval along the vibration direction (X-direction). It is noted that FIG. 1 illustrates only a pair of electrodes 6 and 7 for simplifying a structure of the vibration-powered generator 1. In addition, the width of each electrode 6 and 7 along the vibration direction is denoted by "W2," and an interval between the electrodes 6 and 7 is equally set to "W3."

Here, the width W1 of the electret 2 is equal to the width W2 of the electrodes 6 and 7, and the interval W3 between the electrodes 6 and 7 is sufficiently smaller than the widths W1 and W2. In addition, when no external vibration is applied to the vibration-powered generator 1, that is, when elastic forces received by the movable member 3 from a pair of springs 4 are equal to each other, and the movable member 3 stops with respect to the fixing member 5 (hereinafter, referred to as a "rest state"), a center of the width W1 of the electret 2 matches a center of the interval W3 between the electrodes 6 and 7. Therefore, when the movable member 3 is in the rest state, the electret 2 straddles symmetrically between the electrodes 6 and 7 in the vibration direction. In addition, when the external vibration is applied at maximum possible for the vibration-powered generator 1, the maximum amplitude of the movable member 3 is denoted by "A0," the electret width W1 and the electrode width W2 satisfy the following relationship.

$$W1 = W2 > 2 \times A0$$

For this reason, even when the movable member 3 is vibrated by external vibration with the possible maximum amplitude A0, an end 2a of the movable member 2 of the vibration direction does not cross the interval W3 between electrodes across the entire amplitude. That is, even when the movable member 3 is vibrated with the possible maximum amplitude A0, each of areas of the electret 2 overlapping with the electrodes 6 and 7 changes. However, the electret 2 always straddles between the electrodes 6 and 7. Therefore, the vibration-powered generator 1 of FIG. 1 corresponds to a non-transverse mode vibration-powered generator according to one or more embodiments of the invention. In addition, in the vibration-powered generator 1 as the non-transverse mode vibration-powered generator, the end 2a of the electret 2 does not cross the interval W3 between the electrodes. Therefore, the vibration-powered generator 1 outputs a vibration-induced voltage having a period matching that of the external vibration in principle without adding a ripple voltage to the vibration-induced voltage.

Figure 2:
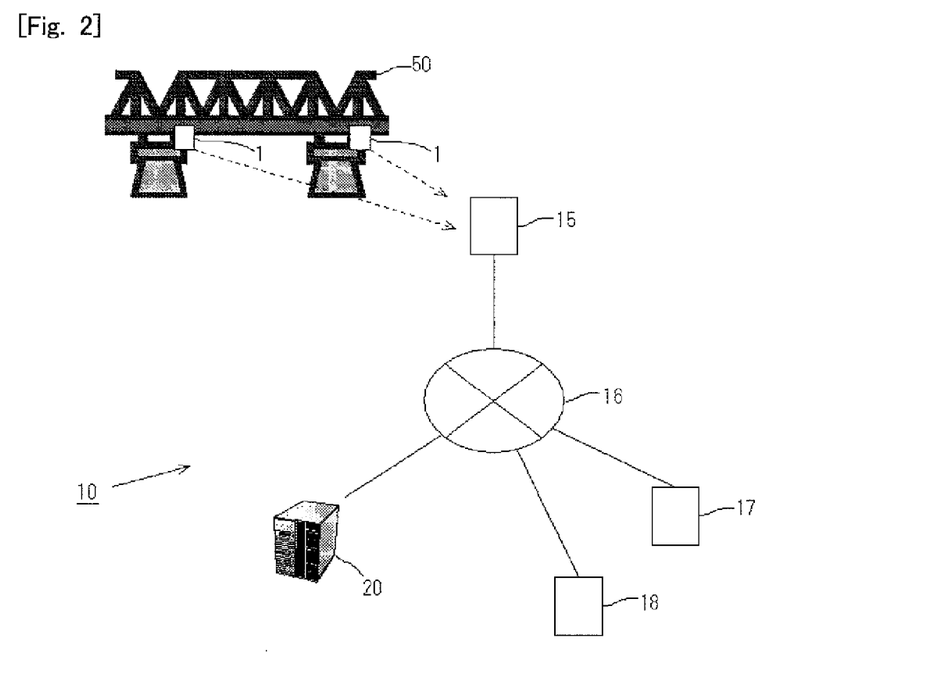
FIG. 2 is a diagram illustrating a schematic configuration of a system for creating information regarding external vibration, including the vibration-powered generator of FIG. 1.

Next, a vibration detection system 10 that creates and collects information regarding external vibration generated from a structure using the vibration-powered generator 1 configured as mentioned above will be described with reference to FIGS. 2 and 3. FIG. 2 is a diagram illustrating a schematic configuration of the vibration detection system 10, and FIG. 3 is a functional block diagram illustrating functionalities exhibited for predetermined purposes in the vibration-powered generator 1 and the server 20 of the vibration detection system 10 as functional units.

Specifically, FIG. 2 illustrates a schematic configuration of the system for detecting vibration information for maintenance of the bridge 50 using the vibration-powered generator 1 according to one or more embodiments of the invention. Since performance such as a strength of the bridge 50 is degraded as a service time elapses, it is necessary to timely recognize a change of performance of the bridge 50. For example, in a progress of degradation of a bridge 50 generated by an earthquake or repeated passage of heavy vehicles, a vibration displacement (amplitude) or a vibration velocity regarding vibration of the bridge 50 also changes. In this regard, more than one vibration-powered generator 1 are installed in the bridge 50. The vibration-powered generators 1 may be installed in places where the strength of the bridge 50 is possibly degraded by vibration and the like. In addition, the vibration-powered generator 1 transmits transition information relating to the output power voltage to a base station 15 in a wireless manner as described below. The base station 15 is connected to the Internet 16, and the received information is transmitted to the server 20 via the Internet 16.

The server 20 performs a process of creating and collecting information regarding external vibration generated in the bridge 50 using the obtained information and determines what state the bridge 50 has (such as a degree of the strength degradation). In addition, the server 20 may obtain other information necessary for the determination (such as weather data of the area where the bridge 50 exists or traffic load data of the bridge 50) from data servers 17 and 18 connected to the Internet 16 and the like.

Figure 3:
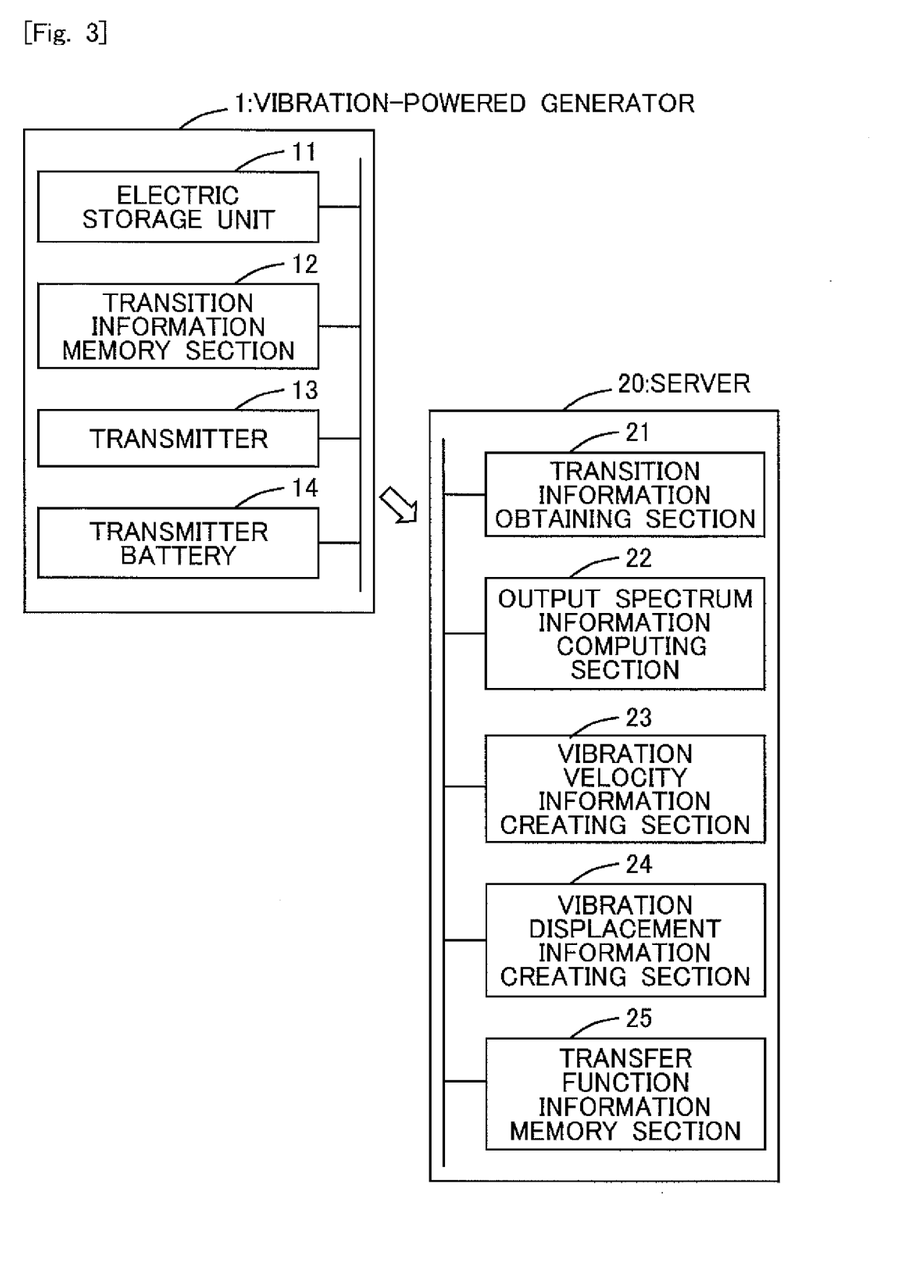
FIG. 3 is a functional block diagram illustrating functionalities of the system of FIG. 2.

Here, FIG. 3 is a functional block diagram illustrating functionalities of the vibration-powered generator 1 and the server 20 serving as a core of the vibration detection system 10. Naturally, the vibration-powered generator 1 and the server 20 may have functional blocks other than those of FIG. 3. The vibration-powered generator 1 includes an electric storage unit 11 and a transition information memory section 12. It is noted that the vibration-powered generator 1 corresponds to a computer having a central processing unit (CPU), a memory, and the like, and such functional blocks are formed by executing a predetermined program therein. The electric storage unit 11 stores electric power generated by external vibration between the electrodes 6 and 7 as vibration-induced electric power. The electric power stored in the electric storage unit 11 is used in various signal processing and the like in the vibration-powered generator 1. The transition information memory section 12 is a functional block that stores information regarding transition of the output power voltage generated by external vibration between the electrodes 6 and 7 (hereinafter, simply referred to as "transition information") in a memory of the vibration-powered generator 1. Electric power necessary in memory is supplied from the electric storage unit 11. In addition, the transition information may be stored in the transition information memory section 12 at any time. Alternatively, the transition information may be stored intermittently at a predetermined period in consideration of suppression of a power consumption necessary in memory or a storage capacity of the memory.

Furthermore, the vibration-powered generator 1 is installed with a transmitter 13 and a transmitter battery 14. The transmitter 13 is a functional block that transmits transition information stored in the transition information memory section 12 to the base station 15. It is noted that, since corresponding electric power is necessary to transmit data to the base station 15 in a wireless manner, the transmission power is supplied from the transmitter battery 14 instead of the electric power stored in the electric storage unit 11. However, when there is a margin in the electric power stored in the electric storage unit 11, the electric power for transmitting information may be supplied from the electric storage unit 11 instead of the transmitter battery 14.

Next, the server 20 includes a transition information obtaining section 21, an output spectrum information computing section 22, a vibration velocity information creating section 23, a vibration displacement information creating section 24, and a transfer function information memory section 25. It is noted that the server 20 corresponds to a computer having a CPU, a memory, and the like, and such functional blocks are formed by executing a predetermined program therein. First, the transition information obtaining section 21 obtains transition information relating to the output power voltage of the vibration-powered generator 1 transmitted from the vibration-powered generator 1 via the base station 15. It is noted that, according to one or more embodiments of the present invention, when the vibration detection system 10 includes a plurality of vibration-powered generators 1 as illustrated in FIG. 2, the transition information obtaining section 21 is managed in a state capable of determining from which vibration detector 1 the obtained transition information is transmitted. Then, the output spectrum information computing section 22 performs a Fourier transform for the transition information obtained by the transition information obtaining section 21 to compute the output spectrum information relating to the transition information. The computation of the output spectrum information will be described below.

Next, the vibration velocity information creating section 23 is a functional block that creates information regarding a vibration velocity out of information regarding external vibration applied to the vibration-powered generator 1 serving as a source of the transition information based on the output spectrum information computed by the output spectrum information computing section 22 and the transfer function information described below. In addition, the vibration displacement information creating section 24 is a functional block that creates information regarding the vibration displacement out of information regarding the external vibration. The creation of information regarding the external vibration will be described below.

Next, the transfer function information memory section 25 is a functional block that stores transfer function information used by the vibration velocity information creating section 23 and the vibration displacement information creating section 24 to create corresponding external vibration information. The corresponding transfer function information is formed based on predetermined proportionality between an external vibration velocity (m/s) and the output power voltage (V) of the vibration-powered generator 1 exhibited to match a frequency of the external vibration input to the vibration-powered generator 1. Under the predetermined proportionality, it is possible to derive a transfer coefficient which is a proportionality constant for determining proportionality between the external vibration velocity and the output power voltage for each frequency of the external vibration. In addition, the transfer function information described above is formed by making a correlation between the transfer coefficient and the frequency of the external vibration.

Figure 4:
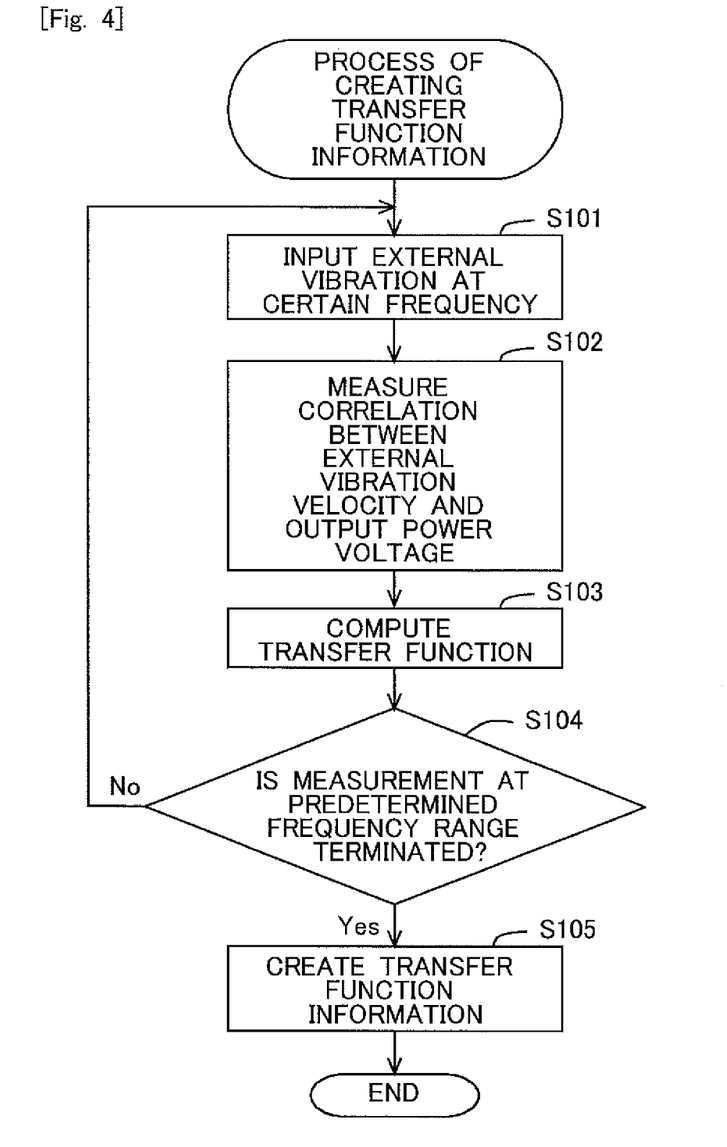
FIG. 4 is a flowchart illustrating a process for creating transfer function information stored in a server of the system of FIG. 2.
Figure 5:
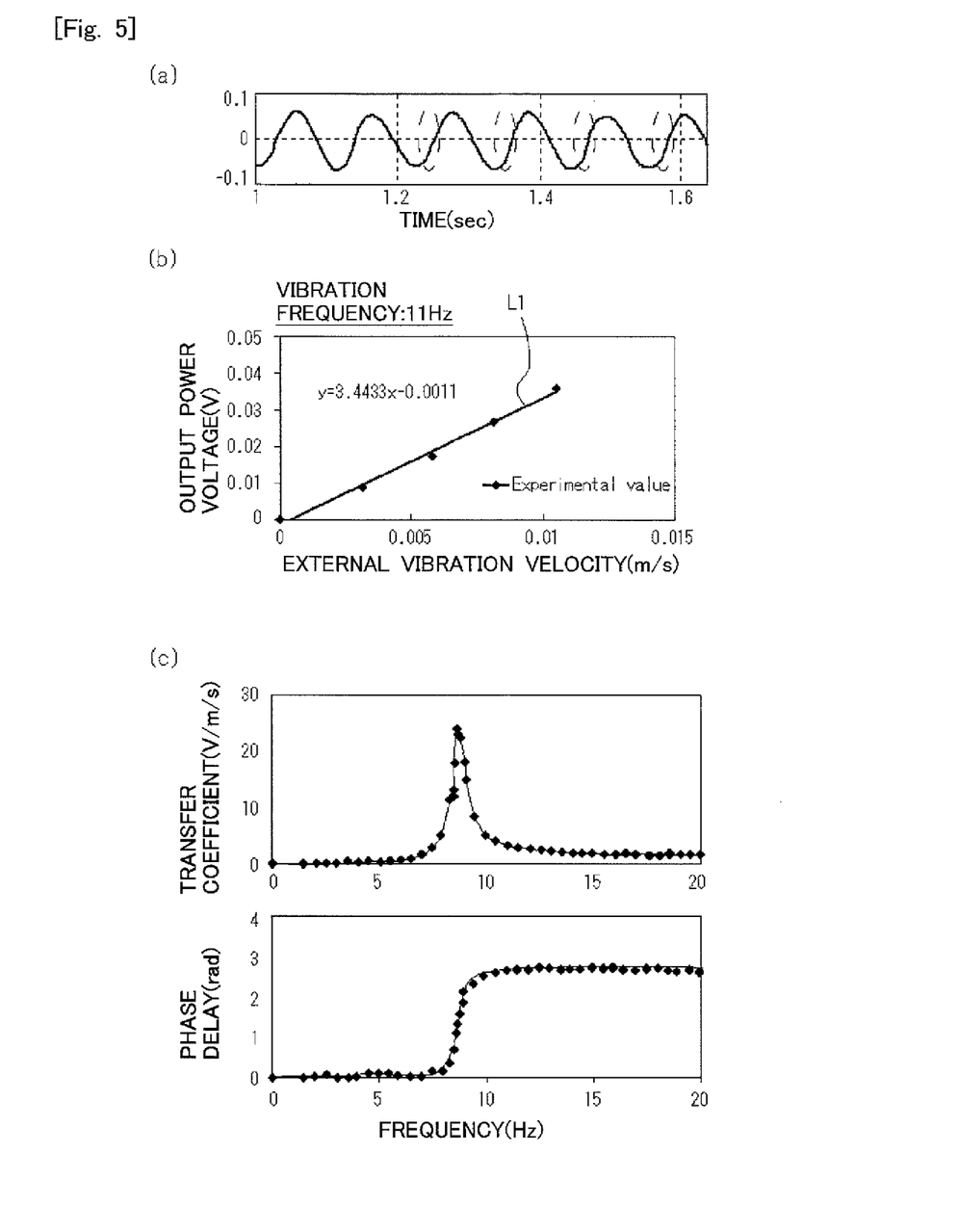
FIG. 5 is a diagram for describing a procedure of creating transfer function information when the process of creating transfer function information of FIG. 4 is performed.

Here, a flow of creating the transfer function information will be described with reference to FIGS. 4 and 5. FIG. 4 is a flowchart illustrating a process of creating the transfer function information. The process of creating the transfer function information is performed by causing the server 20 or other computers (any computer regardless of whether or not the vibration detection system 10 is included) to execute a predetermined program. The transfer function information created as a result is stored in the transfer function information memory section 25. In addition, although the process of creating the transfer function information is performed independently from the process of creating the external vibration information (the process of FIG. 6 described below) in the vibration detection system 10, whether or not the process of creating the transfer function information is performed in advance or simultaneously with the process of creating the external vibration information does not matter. In the latter case, the transfer function information stored in the transfer function information memory section 25 may be sequentially updated.

Hereinafter, the process of creating transfer function information of FIG. 4 will be described in detail. In the following description, it is assumed that this process is performed before the process of creating external vibration information in the vibration detection system 10 (the process of FIG. 6 described below). First, in step S101, external vibration having a certain single frequency is input to the vibration-powered generator 1. In step S102, a correlation between the output power voltage of the vibration-powered generator 1 at this moment and the vibration velocity of the input external vibration is measured. It is noted that the frequency of the input external vibration is a frequency belonging to a predetermined frequency range of external vibration obtained by assuming that the vibration detection system 10 detects vibration of the vibration-powered generator 1. In one or more embodiments of the present invention, the predetermined frequency is set to 0 to 20 Hz, and a correlation between the external vibration velocity and the output power voltage at this moment is measured in step S102 while the frequency of external vibration changes in the unit of 0.5 Hz in step S101.

Next, in step S103, a transfer coefficient is computed based on the measurement result of step S102. Here, computation of the transfer coefficient will be described with reference to FIGS. 5(a) and 5(b). FIG. 5(a) illustrates a transition of the output power voltage when external vibration having a frequency of 11 Hz is input to the vibration-powered generator 1. FIG. 5(b) illustrates a straight line L1 that defines proportionality between the input vibration velocity of the external vibration and the measured output power voltage at a plurality of measurement points (five points in one or more embodiments of the present invention). It is noted that the straight line L1 is obtained from a plurality of measurement points based on an existing method such as a least-square method. In one or more embodiments of the present invention, the straight line L1 is defined as indicated in the following Equation 1.

$$y = 3.4433x - 0.0011 \quad \text{(Equation 1)}$$

("x" denotes an external vibration velocity, and "y" denotes an output power voltage.)

In this case, in Equation 1, a proportionality constant of 3.4433 is set to a transfer coefficient that determines proportionality between the external vibration velocity and the output power voltage. It is noted that, although an intercept of −0.0011 is given in Equation 1, in principle, the output power voltage becomes zero when the external vibration velocity is set to zero. In addition, since a value of the intercept is very insignificant, Equation 1 described above can be treated as representing predetermined proportionality existing between the external vibration velocity and the output power voltage (proportionality defined at the transfer coefficient of 3.4433). In addition, in FIGS. 5(a) and 5(b), the frequency of the input external vibration is set to 11 Hz, and the transfer coefficient is computed for each input of the external vibration that changes in the unit of 0.5 Hz within a predetermined frequency range of 0 to 20 Hz as described above by assuming proportionality between the external vibration velocity and the output power voltage as illustrated in FIG. 5(b).

Then, in step S104, it is determined whether or not the measurement is completed at a predetermined frequency range of 0 to 20 Hz. If it is determined YES in step S104, the process advances to step S105. Otherwise, if it is determined NO in step S104, steps S101 to S103 are executed for non-measured frequencies.

In step S105, the transfer coefficient computed in step S104 is plotted in relation to the frequency of the external vibration corresponding to each transfer coefficient as illustrated in the upper half of FIG. 5(c), so that transfer function information including correlation between a frequency of the external vibration within a predetermined frequency range and the transfer coefficient is created. Based on the transfer function information of one or more embodiments of the present invention, it is possible to recognize a characteristic that the transfer coefficient has a peak value when the frequency of the input external vibration is in the vicinity of 9 Hz. In the lower half of FIG. 5(c), a phase delay is generated in the frequency of the input external vibration and the output power voltage. It is recognized that a phase delay becomes significant when the frequency of the external vibration exceeds approximately 9 Hz.

In this manner, the transfer function information created through the process of creating the transfer function information is information regarding a function for transforming the output power voltage of the vibration-powered generator into the vibration velocity of the external vibration depending on the frequency of the external vibration input to the vibration-powered generator 1. In this regard, a process of creating information regarding external vibration applied to the vibration-powered generator 1, that is, the external vibration velocity information and the external vibration displacement information, from the output power voltage of the vibration-powered generator 1 included in the vibration detection system 10 using this transfer function information will be described with reference to FIGS. 6 and 7. It is noted that this process is executed using the vibration velocity information creating section 23 and the vibration displacement information creating section 24 illustrated in FIG. 3.

Figure 6:
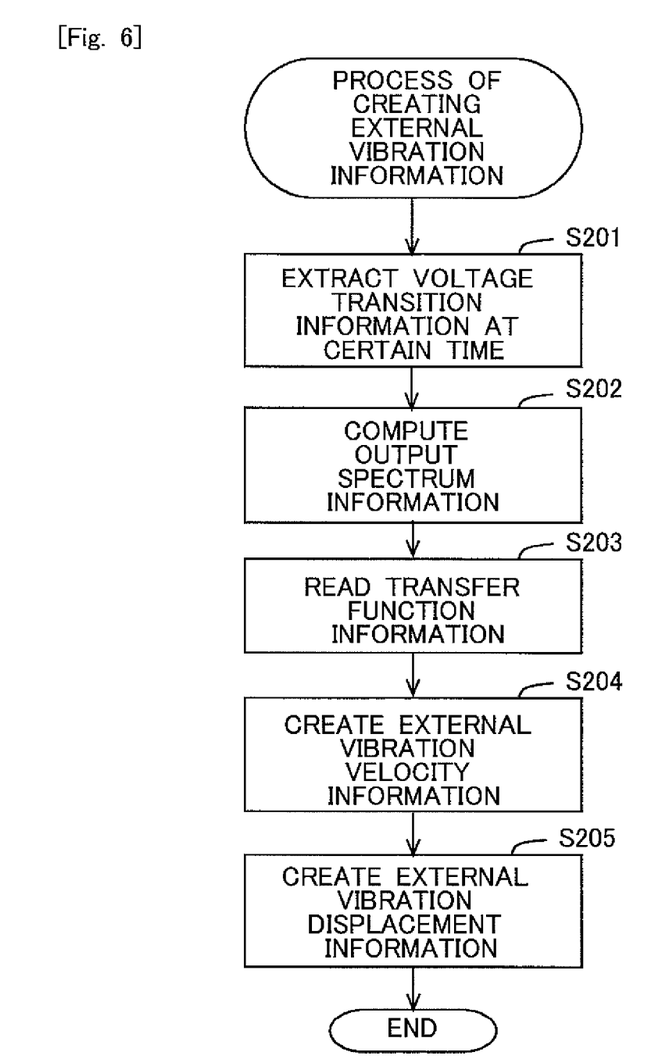
FIG. 6 is a flowchart illustrating a process for creating information regarding external vibration applied to the vibration-powered generator, executed by the system of FIG. 2.
Figure 7:
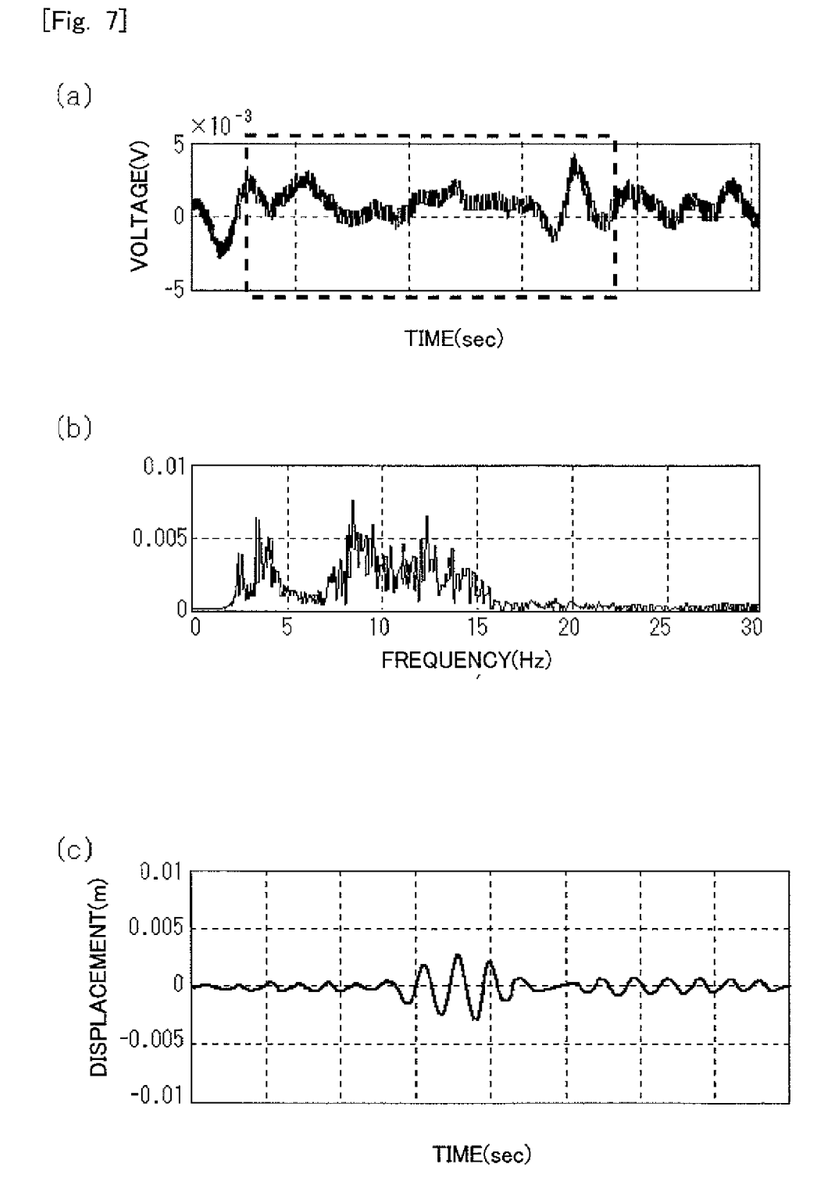
FIG. 7 is a diagram for describing a procedure of creating external vibration information when the process of creating external vibration information of FIG. 6 is performed.

Here, FIG. 6 is a flowchart illustrating a process of creating external vibration information including velocity information and displacement information relating to the external vibration applied to the vibration-powered generator 1 included in the vibration detection system 10 as described above. In step S201, out of transition information from the vibration-powered generator 1, obtained by the transition information obtaining section 21, transition information for a predetermined time period is extracted. For example, out of the transition information of FIG. 7(a), the transition information for a time period surrounded by the dotted line is extracted. This predetermined time period is appropriately set in consideration of a load of the server 20 necessary for the process of creating external vibration information, computation accuracy of the output spectrum information, and the like. As the processing of step S201 is terminated, the process advances to step S202.

In step S202, a Fourier transform is performed for the voltage transition information extracted in step S201 to compute the output spectrum information for the frequency component (refer to FIG. 7(b)). The computation of the output spectrum information may be performed for the predetermined frequency range described above. However, in FIG. 7(b), the output spectrum information is illustrated for a frequency range of 0 to 30 Hz which is wider than the predetermined frequency range. Referring to FIG. 7(b), most of the output spectrum information within the predetermined frequency range is illustrated. As the processing of step S202 is terminated, the process advances to step S203.

In step S203, the transfer function information stored in the transfer function memory section 25 is read, and the process advances to step S204. In step S204, velocity information relating to external vibration is created based on the output spectrum information computed in step S202, that is, the output spectrum information corresponding to the predetermined frequency range (0 to 20 Hz) out of the output spectrum information of FIG. 7(b) and the transfer function information read in step S203. Specifically, by multiplying the output spectrum information value for each frequency by an inverse of the transfer coefficient corresponding to this frequency and performing an inverse Fourier transform in consideration of a phase delay corresponding to this frequency, the external vibration velocity information for a predetermined time period is created.

In step S205, a time-integral is performed for the external vibration velocity information created in step S204 to create external vibration displacement information. The created external vibration displacement information is illustrated in FIG. 7(c). In this manner, the vibration detection system 10 computes the external vibration displacement information by performing a time-integral one time.

The transfer function information used in the process of creating the external vibration information described above is information regarding a function for transforming the output power voltage of the vibration-powered generator 1 into a vibration velocity of external vibration within a predetermined frequency range included in external vibration, and the transfer coefficient included in the transfer function information is a proportionality constant in the proportionality between the output power voltage and the external vibration velocity. Therefore, the transform to the external vibration velocity using the transfer function information is very effective. Accordingly, it is possible to easily and accurately implement computation of the external vibration velocity using this transform. In particular, since the vibration-powered generator 1 is a non-transverse mode vibration-powered generator as illustrated in FIG. 1, a noise caused by a ripple voltage is not contained in the transfer function information, and it is anticipated that the external vibration velocity is created with high accuracy.

In general, vibration generated in the bridge 50 (vibration applied to the vibration-powered generator 1) contains various frequency components. However, as described above, since the transfer function information stored in the transfer function information memory section 25 defines a correlation between the vibration velocity of the external vibration and the output power voltage of the vibration-powered generator at a predetermined frequency range included in the external vibration, it is possible to suitably compute the external vibration information actually applied to the vibration-powered generator 1 based on the output power voltage of the vibration-powered generator 1.

[Modification 1]

The vibration detection system 10 of FIG. 2 includes a vibration-powered generator 1 installed in abridge 50 and a server 20 installed separately. The vibration-powered generator 1 and the server 20 are electrically connected to each other via a radio communication or the Internet communication to receive/transmit information. In this regard, instead of the configuration of the vibration detection system 10 of FIG. 2, the functionalities of the server 20 such as the functionalities of the output spectrum information computing section 22, the vibration velocity information creating section 23, the vibration displacement information creating section 24, and the transfer function information memory section 25 may be provided in the vibration-powered generator 1, and the vibration detection system may be formed therein. That is, the process of creating the external vibration information is performed in the vibration-powered generator 1 provided in the bridge 50 side. Even in this case, according to one or more embodiments of the present invention, from the viewpoint of information collection, the external vibration velocity information and the like created in the vibration-powered generator 1 is collected in the server 20 via a radio communication and the like.

[Modification 2]

In the process of creating external vibration information of FIG. 6, the external vibration velocity information and the external vibration displacement information are created from partial transition information extracted in step S201 out of the transition information obtained by the transition information obtaining section 21. Instead, the external vibration velocity information and the external vibration displacement information may be created based on the entire transition information obtained by the transition information obtaining section 21. In this case, when a temporal range of the transition information as a processing target is relatively long in order to perform the Fourier transform in step S202, a computation error of the output spectrum information may increase depending on a condition of the Fourier transform.

In this regard, a plurality of pieces of partial transition information are extracted from the transition information obtained by the transition information obtaining section 21 using a window function such that a plurality of pieces of partial transition information are overlapped with each other. In addition, the processing of steps S202 to S205 is performed for each of the extracted pieces of partial transition information, so as to create partial external vibration velocity information and partial external vibration displacement information corresponding to the partial transition information. In addition, parts of the partial external vibration velocity information and the partial external vibration displacement information, corresponding to the overlapped parts of the partial transition information, may be superposed for each partial information, so that the entire external vibration velocity information and the entire external vibration displacement information corresponding to the entire transition information may be created. By creating each piece of information in this manner, it is possible to reduce influence of the computation error generated in the Fourier transform described above.

It is noted that a processing regarding superposition of the partial external vibration velocity information and superposition of the partial external vibration displacement information may be performed using various methods such as averaging of information and a predetermined superposition function.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

EXPLANATION OF REFERENCE NUMERALS AND CHARACTERS 1 vibration-powered generator
2 electret 3 movable member
4 spring
5 fixing member
6, 7 electrode
10 vibration detection system
20 server

The invention claimed is:

1. An electret type vibration detection system comprising:
a vibration-powered generator that performs vibration-induced power generation by displacing on a basis of external vibration an electret group formed of a plurality of electrets and an electrode group having a plurality of electrode pairs in a relative movement direction to output a power voltage between electrodes of the electrode pair;
a transfer function memory section that stores transfer function information that associates transfer coefficients with, respectively, a plurality of frequencies in a predetermined frequency range included in the external vibration,
wherein each of the transfer coefficients is a parameter defining a proportional relationship between a vibration velocity of the external vibration and the output power voltage of the vibration-powered generator with respect to an associated frequency;
an output spectrum information computing section that performs a Fourier transform on the transition information relating to the output power voltage of the vibration-powered generator within a predetermined time period to compute output spectrum information relating to the output power voltage; and
a vibration velocity information creating section that creates vibration velocity information relating to the external vibration in the predetermined time period, based on the output spectrum information relating to the output power voltage of the vibration-powered generator computed by the output spectrum information computing section and the transfer function information stored in the transfer function memory section,
wherein the vibration velocity information creating section creates the vibration velocity information relating to the external vibration in the predetermined time period, by multiplying the output spectrum information for each frequency by an inverse of the transfer coefficient corresponding to each frequency and performing an inverse Fourier transform in consideration of a phase delay corresponding to each frequency.

2. The electret type vibration detection system according to claim 1, further comprising:
a vibration displacement information creating section that creates vibration displacement information relating to the external vibration within the predetermined time period by integrating the vibration velocity information relating to the external vibration in the predetermined time period created by the vibration velocity information creating section.

3. The electret type vibration detection system according to claim 1,
wherein the vibration-powered generator comprises:
a casing that houses the electret group and the electrode group,
a firing member that is provided with the electrode group and fixed to the casing side, and
a movable member that is provided with the electret group and that is capable of relatively moving on the basis of the external vibration while facing the fixing member, and
wherein ends of each electret included in the electret group along the relative movement direction at a possible maximum amplitude assumed when the movable member is vibrated by the external vibration do not cross an electrode-side interval between adjacent electrodes of the electrode group.

4. A method of creating external vibration information, comprising:
obtaining transition information relating to an output power voltage within a predetermined time period from a vibration-powered generator that performs vibration-induced power generation by displacing on a basis of external vibration an electret group formed of a plurality of electrets and an electrode group having a plurality of electrode pairs in a relative movement direction by virtue of external vibration and outputs a vibration-induced voltage between electrodes of the electrode pair;
computing output spectrum information relating to the output power voltage by performing a Fourier transform on the obtained transition information relating to the output power voltage; and
creating vibration velocity information relating to external vibration within the predetermined period based on the computed output spectrum information and transfer function information that associates transfer coefficients with, respectively, a plurality of frequencies in a predetermined frequency range included in the external vibration and the output power voltage of the vibration-powered generator,
wherein each of the transfer coefficients is a parameter defining a proportional relationship between a vibration velocity of the external vibration and the output power voltage of the vibration-powered generator with respect to an associated frequency, and
wherein the vibration velocity information creating step creates the vibration velocity information relating to the external vibration in the predetermined time period, by multiplying the output spectrum information for each frequency by an inverse of the transfer coefficient corresponding to each frequency and performing an inverse Fourier transform in consideration of a phase delay corresponding to each frequency.

5. The method of creating external vibration information according to claim 4, further comprising:
creating vibration displacement information relating to the external vibration within the predetermined time period by integrating the created vibration velocity information relating to the external vibration in the predetermined time period.

6. The method of creating external vibration information according to claim 4,
wherein the vibration-powered generator comprises:
a casing that houses the electret group and the electrode group,
a fixing member that is provided with the electrode group and fixed to the casing side, and
a movable member that is provided with the electret group ant that is capable of relatively moving on the basis of the external vibration while facing the fixing member, and
wherein ends of each electret included in the electret group along the relative movement direction at a possible maximum amplitude assumed when the movable member is vibrated on the basis of the external vibration do not cross an electrode-side interval between adjacent electrodes of the electrode group.

7. A program stored on a non-transitory computer-readable medium for creating external vibration information, the program causing a computer to create information regarding external vibration applied to a vibration-powered generator that performs vibration-induced power generation by displacing on a basis of external vibration an electret group formed of a plurality of electrets and an electrode group having a plurality of electrode pairs in a relative movement direction and outputs a vibration-induced voltage between electrodes of the electrode pair, the program causing the computer to perform:

obtaining transition information relating to an output power voltage within a predetermined time period from the vibration-powered generator;

computing output spectrum information relating to the output power voltage by performing a Fourier transform on the obtained transition information relating to the output power voltage; and creating vibration velocity information relating to the external vibration within the predetermined period based on the computed output spectrum information and transfer function information that associates transfer coefficients with, respectively, a plurality of frequencies in a predetermined frequency range included in the external vibration and the output power voltage of the vibration-powered generator, wherein each of the transfer coefficients is a parameter defining a proportional relationship between a vibration velocity of the external vibration and the output power voltage of the vibration-powered generator with respect to an associated frequency, and wherein the vibration velocity information creating step creates the vibration velocity information relating to the external vibration in the predetermined time period, by multiplying the output spectrum information for each frequency by an inverse of the transfer coefficient corresponding to each frequency and performing an inverse Fourier transform in consideration of a phase delay corresponding to each frequency.

8. The program stored on a non-transitory computer-readable medium for creating external vibration information according to claim 7, wherein the program further causes the computer to create vibration displacement information relating to the external vibration within the predetermined time period by integrating the created vibration velocity information relating to the external vibration in the predetermined time period.

9. The program stored on a non-transitory computer-readable medium for creating external vibration information according to claim 7, wherein the vibration-powered generator comprises:

a casing that houses the electret group and the electrode group, a fixing member that is provided with the electrode group and fixed to the casing side, and a movable member that is provided with the electret group and that is capable of relatively moving on the basis of the external vibration while facing the fixing member, and wherein ends of each electret included in the electret group along the relative movement direction at a possible maximum amplitude assumed when the movable member is vibrated by the external vibration do not cross an electrode-side interval between adjacent electrodes of the electrode group.

* * * * *

UNITED STATES PATENT AND TRADEMARK OFFICE
CERTIFICATE OF CORRECTION

PATENT NO.         : 9,964,434 B2
APPLICATION NO.    : 14/404926
DATED              : May 8, 2018
INVENTOR(S)        : Tatsuakira Masaki et al.

It is certified that error appears in the above-identified patent and that said Letters Patent is hereby corrected as shown below:

In the Claims

At Column 17, Claim number 3, Line number 63, the word "firing" should read --fixing--.

Signed and Sealed this
Eighteenth Day of September, 2018

Andrei Iancu
*Director of the United States Patent and Trademark Office*